H. R. FRENCH.
CULINARY DEVICE FOR PREPARING OMELET AND OTHER ARTICLES OF FOOD.
APPLICATION FILED MAR. 13, 1909.
924,336.
Patented June 8, 1909.
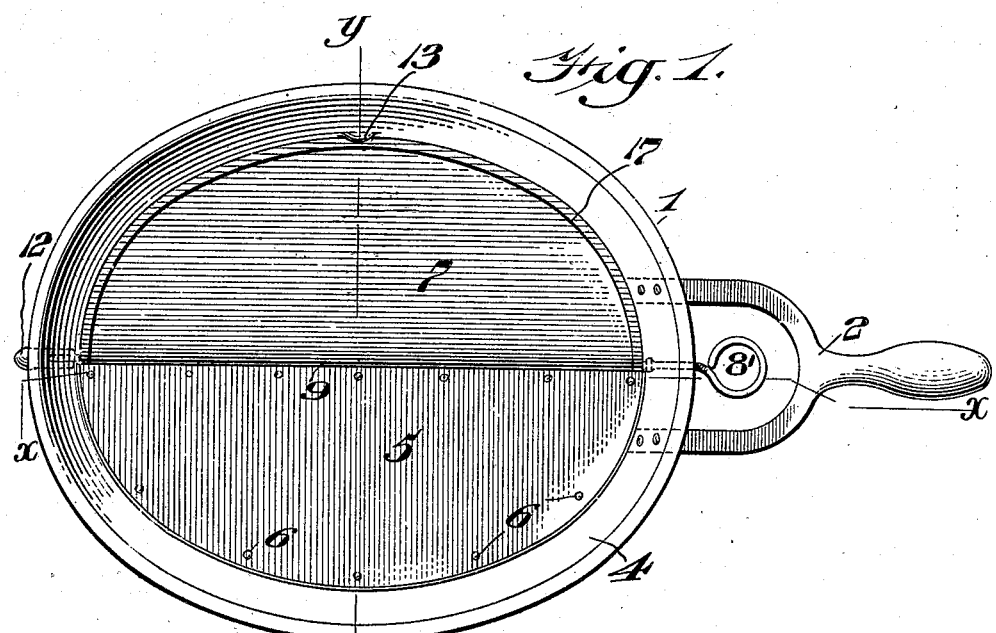

UNITED STATES PATENT OFFICE.

HELEN R. FRENCH, OF PHILADELPHIA, PENNSYLVANIA.

CULINARY DEVICE FOR PREPARING OMELET AND OTHER ARTICLES OF FOOD.

No. 924,336.

Specification of Letters Patent.

Patented June 8, 1909.

Application filed March 13, 1909. Serial No. 483,117.

*To all whom it may concern:*

Be it known that I, HELEN R. FRENCH, a citizen of the United States, residing in the city and county of Philadelphia, State of Pennsylvania, have invented a new and useful Culinary Device for Preparing Omelet and other Articles of Food, of which the following is a specification.

My present invention consists of a novel construction of a culinary device for preparing omelet and other articles of food, by the employment of which the articles being cooked, such as omelets, shad roe, potatoes and the like may be browned on both sides as desired without any liability of the food being cooked becoming broken up into small pieces, as is liable to occur when the articles are turned by means of a knife or other implement.

It further consists of other novel features of construction all as will be hereinafter fully set forth.

For the purpose of illustrating my invention, I have shown in the accompanying drawings a preferred form thereof since this embodiment gives satisfactory and reliable results in practice, although it is to be understood that the various instrumentalities of which my invention consists can be variously arranged and organized so that my invention is not limited to the exact arrangement and organization of these instrumentalities as herein illustrated.

Figure 1 represents a plan view of a culinary device for preparing omelets and other articles of food, embodying my invention. Fig. 2 represents a section on line $x$—$x$, Fig. 1. Fig. 3 represents a plan view of the actuating handle in detached position. Fig. 4 represents a section on line $y$—$y$, Fig. 1.

Similar numerals of reference indicate corresponding parts in the figures.

Referring to the drawings:—1 designates a culinary device embodying my invention, the same consisting of a pan or dish having any desired contour and preferably provided with a handle 2 by means of which the device may be readily handled.

The device is provided with a bottom member 3 and sides 4 in the usual manner.

5 designates a false bottom which is secured to the device in any desired manner and in the present instance I have shown the same as being secured by means of rivets or equivalent fastening devices 6. The bottom member 5 in the present instance covers substantially one-half of the bottom of the pan, the other half thereof being covered by a pivoted bottom member 7 whose pintle 8 has an actuating handle $8^1$, the same being fixed thereto in any desired manner although in the present instance I have shown for purposes of illustration the connecting pintle 8 as having a polygonal shape and the inner edge of the member 7 deflected, as indicated at 9, in order to form a polygonal-shaped opening therein. The sides of the pan are suitably apertured in order to receive the pintle 8, it being best seen in Figs. 2 and 3 that the pintle 8 is provided with a shoulder 10 near one end which is adapted to abut against the side 4, which, if desired, may be suitably flattened at this point, as indicated in Fig. 2. The other end of the pintle 8 is threaded, as indicated at 11, thereby adapting the same to receive a suitable nut 12 so that the parts will be maintained in assembled position. The side 4 of the pan is, in the present instance, inwardly deflected as is indicated at 13, thereby forming preferably a resilient catch for maintaining the movable bottom section 7 in its normal position, as is indicated in the drawings. The fixed bottom member 5 is downwardly deflected as is indicated at 14 and then curves upwardly, as is indicated at 15, thereby forming a channel so that when the pivoted member 7 is rocked upwardly there will be no liability of the butter or other liquid on the fixed bottom member 5 flowing into the chamber 16 formed beneath the movable bottom member 7.

It will now be apparent that the pivoted member 7 is normally maintained in the position indicated in Fig. 1 owing to the provision of the catch 13. In order to reinforce the outer periphery of the movable member 7 the outer edge is preferably folded over, as indicated at 17. In practice when an article is being cooked, for example, an omelet, and it is desired to turn over or roll the same, it is simply necessary to partially rotate the handle $8^1$, and owing to the manner in which this handle is connected with the pivoted member 7 that portion of the omelet on the member 7 will be turned or rolled over on to that portion of the omelet which is on the fixed bottom member 5. It will be apparent that by thus turning or rolling over the article which is being cooked there will be no liability of the same becoming broken up and such article of food will be turned or rolled over in one piece.

I wish to call special attention to the manner in which my device may be readily and quickly taken apart and assembled when it is desired to clean the same. By simply unscrewing the nut 12, the pintle 8 may be removed from its engagement with the sides 4 of the pan and from the movable member 7 so that all of the parts are readily accessible for cleaning purposes.

The device may be readily and cheaply manufactured and owing to the manner in which the parts are assembled there is no liability of the same getting out of order.

It will, of course, be apparent that while in the present instance I have shown the pintle 8 as having a polygonal contour in order to engage with the movable member 7, this movable member may be fixed relatively to the pintle 8 in any desired manner and still be within the scope of my invention.

In so far as I am aware, I am the first in the art to employ in a device of this character a false bottom consisting of a fixed portion having its outer periphery contacting with the sides of the pan and its inner side deflected to form a channel in order to prevent any liquid flowing from the fixed side to the chamber beneath the movable side, in combination with a movable bottom member having a suitable actuating means and it is to be understood that my claims to these features are to be interpreted with corresponding scope.

I wish to call special attention to the fact that both the fixed and movable sections 5 and 7 respectively are in substantially the same plane when the movable section 7 is in its normal position and in engagement with the catch 13 provided therefor.

It will now be apparent that I have devised a novel and useful construction of a culinary device for preparing omelet and other articles of food which embodies the features of advantage enumerated as desirable in the foregoing, and while I have in the present instance shown and described a preferred embodiment thereof which in practice will give satisfactory and reliable results, it is to be understood that the same is susceptible of modifications in various particulars without departing from the spirit and scope of my invention or sacrificing any of its advantages.

Having thus described my invention, what I claim as new and desire to secure by Letters Patent, is:—

1. In a device of the character stated, the combination of a pan, a sectional false bottom therefor, one of said sections being fixed and the other section movable, an actuating handle on which said movable section is mounted, and means for maintaining said movable section in normal position.

2. In a device of the character stated, a pan, a sectional false bottom therefor, consisting of a fixed and a movable member, said fixed section being downwardly and upwardly deflected at one side to form a channel to prevent passage of liquid therefrom, a handle passing through said pan and upon which said movable member is rigidly mounted, and means for maintaining said movable member in normal position.

3. In a device of the character stated, the combination of a pan, a sectional false bottom therein consisting of a fixed and a movable member, said fixed member being deflected to form a channel at one side to prevent passage of liquid therefrom, a rod having a shoulder at one end and a thread at the other end thereof, and mounted on said pan, said movable member being rigidly mounted on said rod, and a nut engaging said thread.

4. In a device of the character stated, a pan, a sectional false bottom therefor consisting of a fixed and a pivoted member normally in the same plane, said fixed member being downwardly and upwardly deflected and extending beneath the inner side of said movable member, and an actuating handle mounted in said pan and on which said movable member is mounted.

5. In a device of the character stated, a pan, a sectional false bottom therefor consisting of a fixed and a movable member of substantially hemispherical shape, said fixed member having its inner side downwardly and upwardly deflected to form a channel, an actuating lever carried by the sides of said pan and located in said channel, said movable member being rigidly mounted on said handle, and the side of said pan being inwardly deflected to form a catch for maintaining said movable member in normal position.

6. In a device of the character stated, a pan having a false bottom formed of hinge sections centrally connected, a member of said hinge constituting a liquid receiving channel.

7. In a device of the character stated, a pan having a false bottom formed of sections, and a hinge connecting the latter, the pintle of said hinge being removably fitted in the butt of the same and having means for holding it in operative position.

8. In a device of the character described, a pan, a sectional false bottom therefor, one of said sections being fixed within the pan and the other movable, and an actuating handle suitably connected with said movable section.

9. In a device of the character described, a pan having a false bottom formed of sections, and means for actuating one of said sections toward the other, and a portion of one of said sections forming a liquid receiving channel.

10. In a pan, sides, and a sectional bottom therefor, one of said sections being fixed within the pan below the top of the sides and the other section being movably mounted and normally in alinement with said fixed section, and an actuating handle suitably connected with said movable section.

HELEN R. FRENCH.

Witnesses:
JOHN A. WIEDERSHEIM,
C. D. McVAY.